Patented Oct. 11, 1927.

1,644,712

UNITED STATES PATENT OFFICE.

ANTONIUS DE GRAAFF, OF EINDHOVEN, NETHERLANDS, ASSIGNOR TO GENERAL ELECTRIC COMPANY, A CORPORATION OF NEW YORK.

ELECTRIC LAMP.

No Drawing. Application filed April 17, 1923. Serial No. 632,790, and in the Netherlands April 27, 1922.

This invention relates to electric lamps having a filament of refractory metal such as tungsten.

Coiled filaments are generally used in lamps with a gaseous filling but sometimes they are also employed in vacuum lamps.

A disadvantage of coiled filament lamps is the sagging of the filament during the operation of the lamp and the invention has for its object the neutralization of this objectionable property of the filament or the decrease of it.

According to the invention a small supply of hydrogen is introduced into electric lamps with filaments of a refractory metal provided with a drying-medium.

The invention is preferably applicable to gasfilled lamps of the above described type, although it may be also applied under certain circumstances to vacuum lamps with coiled filaments.

Heretofore the introduction of hydrogen into an electric lamp has been carefully avoided. In gasfilled lamps large supplies of hydrogen are inconvenient for the reason that hydrogen has a much higher heat-conductivity than the gases commonly used (argon and nitrogen). But even very small quantities of hydrogen are considered in good reason to be deleterious, said gas with the small quantities of oxygen that are usually present or produced, forming water-vapour which is known to have a very deleterious effect on the life of the lamps.

In order to make water-vapour in the lamps inoffensive it has been proposed to place drying-mediums such as the pentoxide of phosphorus and the oxide of barium in the lamps. It has also been suggested to place substances in the lamp that while hot will form drying-mediums by decomposition and in this connection $P_4O$ and the oxide of barium have been mentioned as suitable compounds.

Very good results have been obtained with several known drying-mediums but the above mentioned disadvantage i. e. the sagging of the filaments was not less in lamps provided with such drying-mediums than in other lamps.

It has been found advisable that in lamps provided with drying-mediums a certain small quantity of hydrogen should be introduced the sagging of the filaments being considerably reduced thereby.

The favourable effect of the hydrogen may be explained as follows:

In practice it has been found that as a rule slight residues of oxygen or oxygen-compounds stay behind in electric lamps or they are produced therein during the manufacture. Oxygen however attacks the filaments and even if only a very small quantity of oxygen is present, the filament sags more than otherwise.

In lamps provided with a drying medium the water-vapour is rendered harmless but not the oxygen. If on the contrary a small quantity of hydrogen is introduced in the lamps during the manufacture said hydrogen associates with the oxygen, thus forming water-vapour which is absorbed by the drying-medium.

According to the invention as large a quantity hydrogen is introduced into the lamp as to make it possible that any free oxygen which may be present reacts with the hydrogen and preferably a small excess of hydrogen always stays behind.

It is to be understood that in practice the quantity of hydrogen will be kept small, its heat-conductivity being higher than that of the usual gases argon and nitrogen and therefore practical considerations ought to settle the correct proportion of the said quantity.

It has been found that this correct proportion varies from about 0.5% to 4% of the gaseous filling.

What I claim is:

1. In an incandescent filament lamp, an oxygen-getter consisting of a combination of hydrogen and a drying agent whereby excessive sagging is prevented, said drying agent being $P_4O$.

2. In an incandescent filament lamp, an oxygen-getter consisting of a combination of hydrogen and a drying agent whereby excessive sagging is prevented, said drying agent being $P_4O$, the hydrogen being diluted by another gas, the percentage of the hydrogen gas being from 0.5% to 4% of the gaseous filling.

In testimony whereof I affix my signature.

ANTONIUS DE GRAAFF.